UNITED STATES PATENT OFFICE.

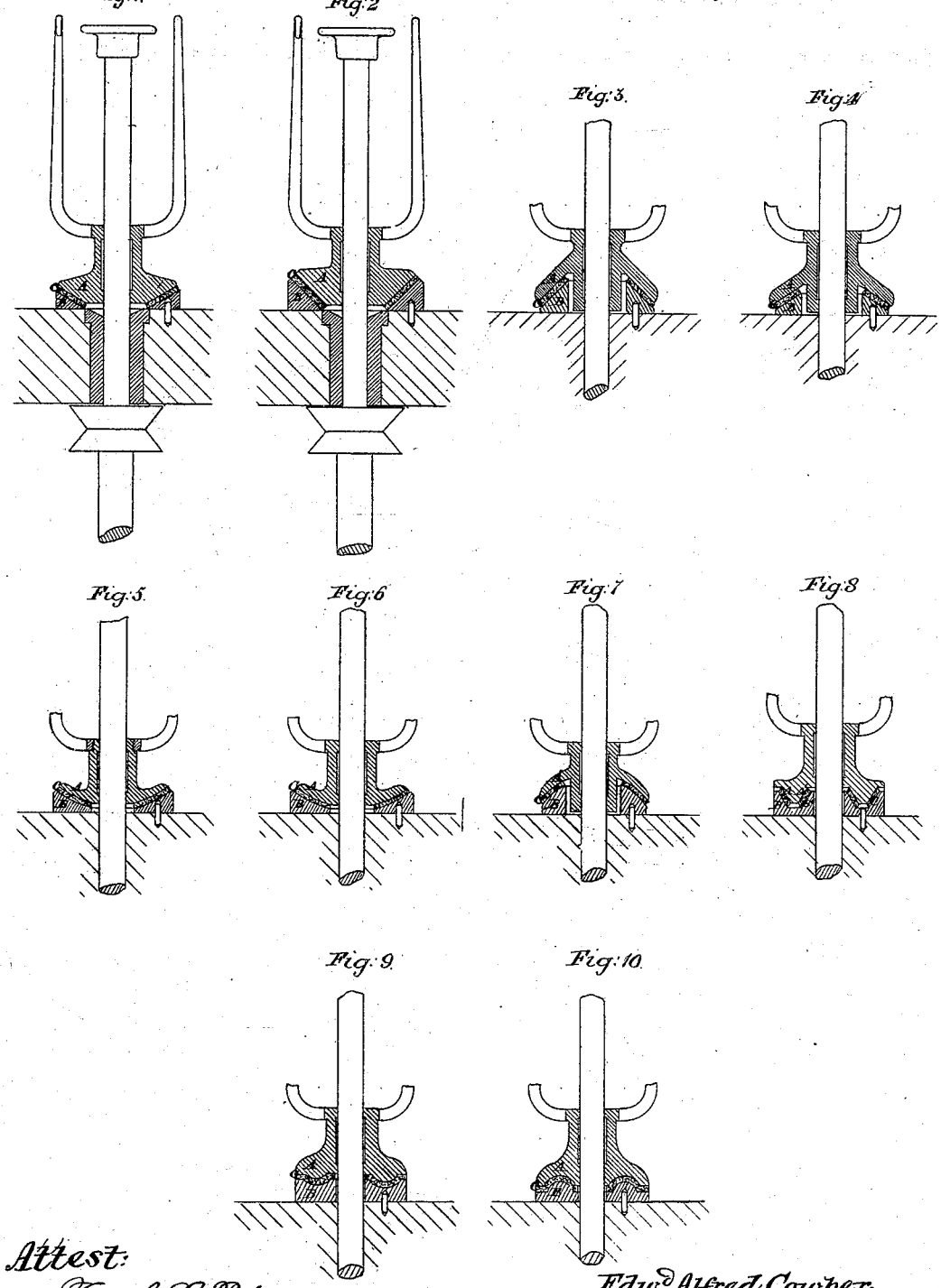

EDWARD A. COWPER, OF WESTMINSTER, ENGLAND.

IMPROVEMENT IN FLIER-BEARINGS FOR SPINNING-MACHINES.

Specification forming part of Letters Patent No. 203,424, dated May 7, 1878; application filed January 16, 1878; patented in England March 12, 1877.

*To all whom it may concern:*

Be it known that I, EDWARD ALFRED COWPER, of No. 6 Great George street, Westminster, in the county of Middlesex, England, consulting engineer, have invented an Improvement in Flier-Bearings for Spinning-Machines; and do hereby declare that the following description, taken in connection with the accompanying sheets of drawings hereinafter referred to, forms a full and exact specification of the same, wherein I have set forth the nature and principles of my said improvements, by which my invention may be distinguished from others of a similar class, together with such parts as I claim and desire to secure by Letters Patent—that is to say:

This invention relates to certain improvements in that class of apparatus known as "throstle doubling and spinning machines," in which a positive motion is imparted to the bobbin, and a variable motion to the inverted flier; and it has for its object to maintain the flier in a position concentric with the spindle, and prevent undue pressure of said flier upon the spindle in any direction, and to better retain the oil against the action of centrifugal force, as more fully hereinafter specified.

To this end my invention consists in making the bearing-surfaces of the boss of the flier and the copping-rail conical or semicircular in cross-section, and interposing between the same a soft substance, such as flannel, on which the weight of the flier and its boss rests, to give the friction for producing the necessary drag on the thread as it passes down from the rolls through the eye of the inverted flier to the bobbin, which is driven by the spindle.

In the drawings, Figure 1 represents a sectional view of my invention, in which the boss of the flier is formed with a conical bearing, and the copping-rail with a recessed conical seat for the same. Fig. 2 represents the same arrangement, with the cones of a sharper angle. Figs. 3 and 4 represent sectional views of a modification of my invention, in which the boss of the flier is provided with a recessed conical bearing, and the copping-frame with a conical seat, upon which said recessed bearing fits. Figs. 5 and 6 represent sectional views of a modification of my invention, showing the flier-boss, having a convex spherical bearing, and the seat B on the copping-rail, with a similarly-shaped concave. Fig. 7 represents a similar view, showing the boss constructed with a concave spherical bearing, and the seat on the copping-rail with a corresponding convex shape. Fig. 8 represents a modification of my invention, in which the boss of the flier is provided with an annular bearing-surface, conical in cross-section, and the copping-frame with a correspondingly-recessed seat; and Figs. 9 and 10 represent modifications, in which the annular bearings and seats are semicircular in cross-section.

The letter A represents the boss of flier, which is formed with a bearing-surface angular or semi-cylindrical in cross-section; and B, the seat on the copping-rail, which is correspondingly shaped for the reception of the bearing on the boss of the flier. The letter C represents a packing of soft, porous material, such as flannel, or other analogous substance, interposed between the bearing and its seat.

The bearing on the boss of the flier and its corresponding seat on the copping-rail may be formed as shown in any of the various modifications of my invention, although I prefer to make the boss of the flier with a convex bearing, and the seat of the same on the copping-rail in the shape of a concave recess, for the reason that the lubricating material will be better held in such construction against the action of centrifugal force; but in either form it will be seen that the inclined surface of the seat prevents the flier from being forced against the spindle in any particular direction, as is the case when the friction-surfaces of the boss and its seat are flat.

Having thus described my invention, what I claim is—

In a throstle spinning and doubling machine, a flier having a concave or convex bearing-surface, in combination with a correspondingly-shaped seat on the copping-frame, and an interposed packing of soft or elastic material, substantially as and for the purposes specified.

In testimony whereof I have signed my name to this specification in the presence of two subscribing witnesses this 17th day of December, 1877.

EDWARD ALFRED COWPER.

Witnesses:
 CHAS. D. ABEL,
 FREDK. TAYLOR.